(No Model.) 2 Sheets—Sheet 1.
J. J. MILLER.
MOTOR CAR FOR UNDERGROUND ELECTRIC SYSTEMS.
No. 454,178. Patented June 16, 1891.
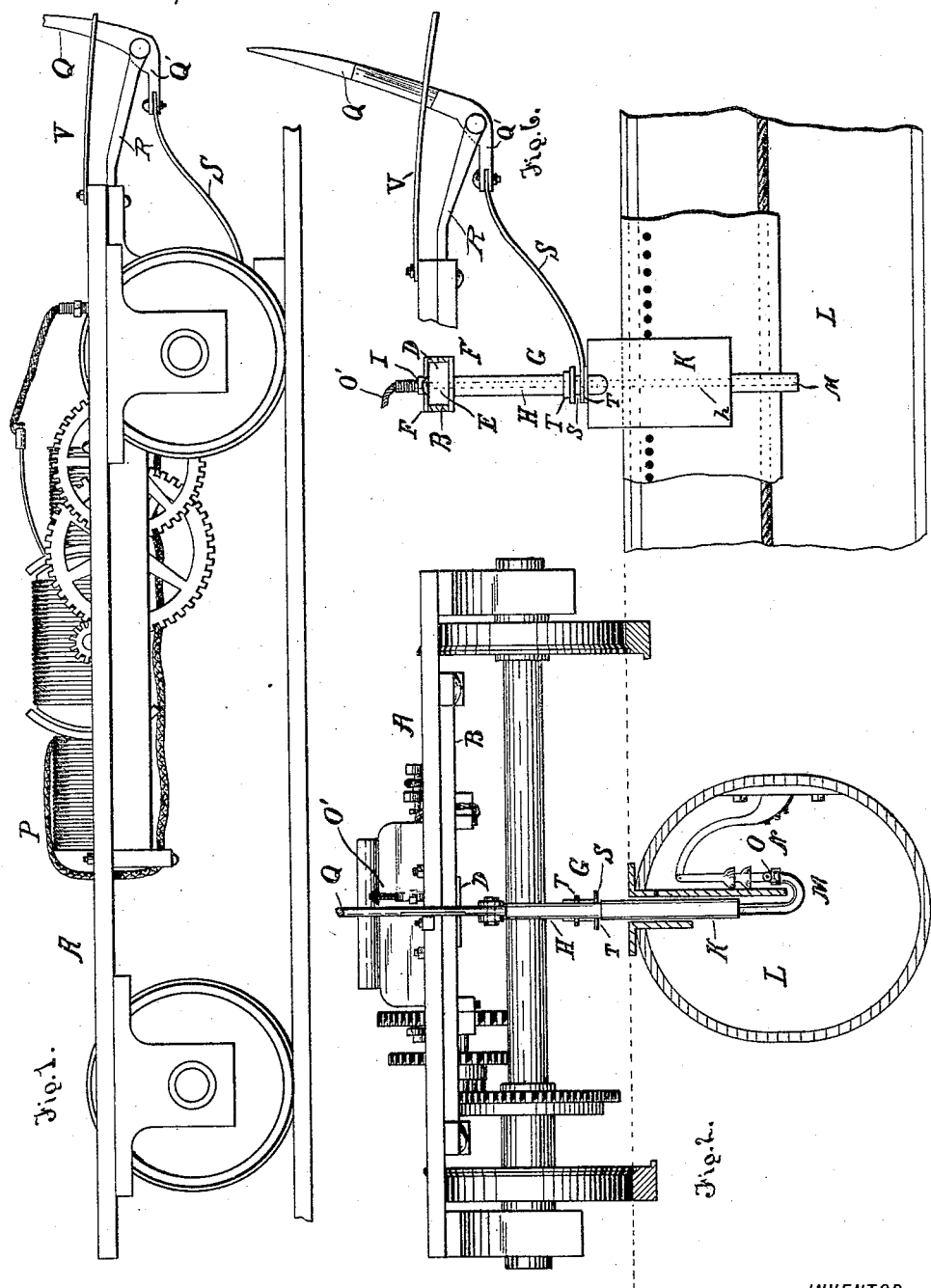
WITNESSES:
INVENTOR
John J. Miller
ATTORNEY.

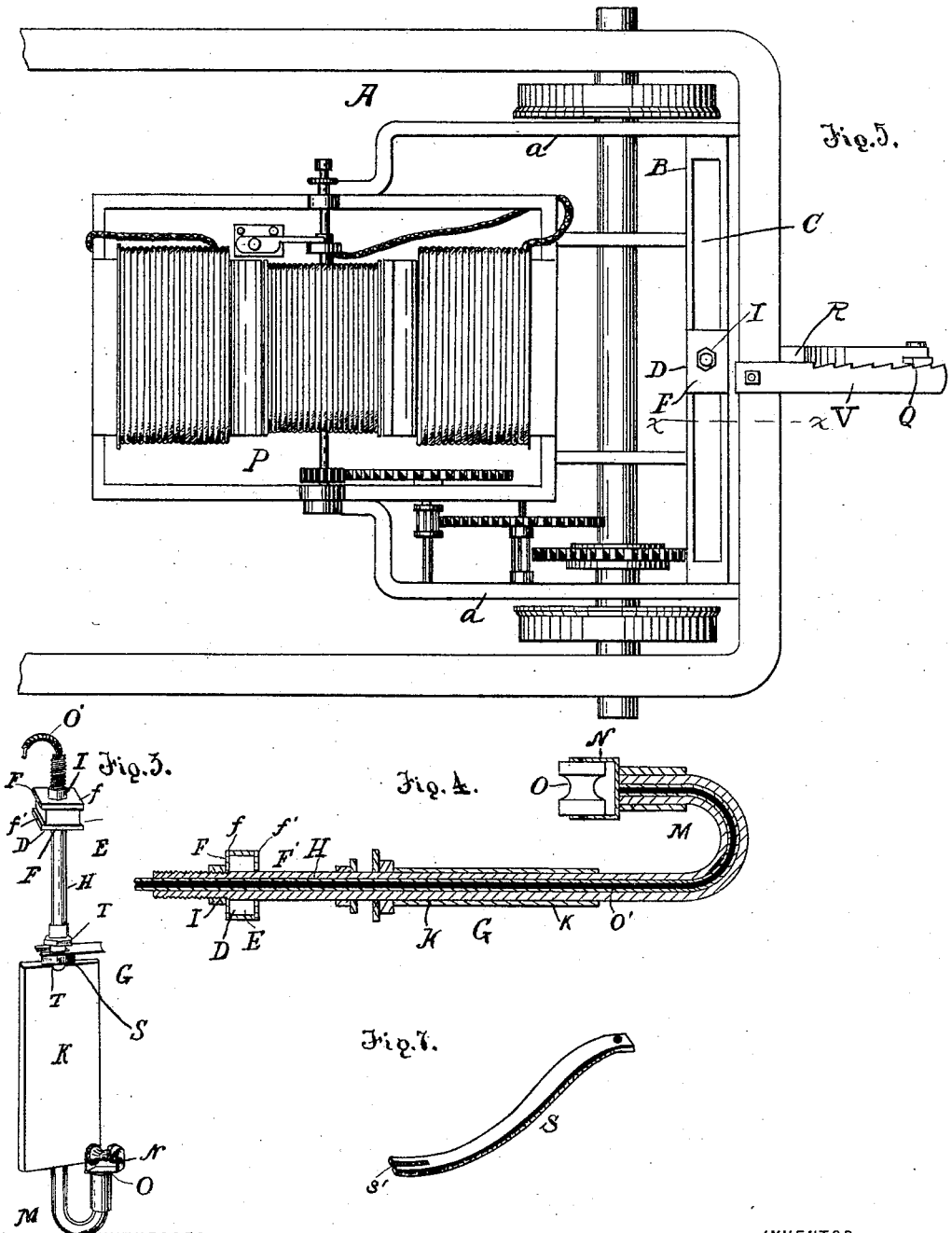

UNITED STATES PATENT OFFICE.

JOHN J. MILLER, OF PITTSBURG, PENNSYLVANIA.

MOTOR-CAR FOR UNDERGROUND ELECTRIC SYSTEMS.

SPECIFICATION forming part of Letters Patent No. 454,178, dated June 16, 1891.

Application filed February 14, 1891. Serial No. 381,466. (No model.)

*To all whom it may concern:*

Be it known that I, JOHN J. MILLER, a citizen of the United States, residing at Pittsburg, in the county of Allegheny and State of Pennsylvania, have invented certain new and useful Improvements in Motor-Cars for Underground or Subway Electric Systems; and I do hereby declare that the following is a full, clear, and exact description of the invention, which will enable others skilled in the art to which it appertains to make and use the same, reference being had to the accompanying drawings, which form a part of this specification.

My invention has for its object to provide means to prevent straining of the trolley-arm in passing around curves and in case the car leaves the track; to provide means to prevent the trolley from leaving the wire when the car leaves the track; to provide means to secure an even and uniform pressure of the trolley upon the wire and enable it to pass readily over inequalities or irregularities in the latter; to provide means to prevent deflection or loss of current by conduction, and to provide means to prevent moisture from running down the trolley-arm to the wire.

With these objects in view the invention consists in the construction and arrangement of the trolley-arm and the manner of connecting the trolley thereto; in the arrangement of the insulating means for the conductor and the manner of connecting the latter to the trolley; in the construction and arrangement of the slide to which the trolley-arm is connected; in the arrangement and adaptation of the operating-lever; in the construction and arrangement of the spring-arm and the manner of connecting the same to the trolley-arm, and in certain details of construction and arrangement, which will be fully described hereinafter in connection with the drawings, wherein—

Figure 1 is a side view of a truck provided with my invention. Fig. 2 is a front view of the same, showing the conduit in cross-section. Fig. 3 is a detail view of the trolley-arm. Fig. 4 is a longitudinal sectional view of the trolley-arm. Fig. 5 is a plan view of the truck with the invention in the operative position. Fig. 6 is a central longitudinal sectional view on line $x\,x$ of Fig. 5. Fig. 7 is a detail view of the spring-arm.

The car-truck A is provided at its front end with a transverse horizontal bar B, having a longitudinal slot C. This bar is preferably secured at its ends to the side bars $a\,a$ of the truck, and the slot extends a considerable distance on each side of the center of the truck. Within this slot is mounted a slide D, which consists of a body or block E, rectangular in shape and equal in width to the slot, so as to fit snugly therein, and provided at its upper and lower sides with lateral flanges $f\,f'$, which bear upon the upper and lower surfaces of the bar. These flanges are formed by plates F F', which are secured to the upper and lower sides of the body or block.

The trolley-arm G is provided at its upper end with a stem H, which fits in a vertical perforation in the center of the slide, said stem being round and smooth, whereby it may move vertically and turn freely in the slide. The upper end of the stem (above the slide) is threaded, and upon the threaded portion is arranged a nut or adjustable stop I, which limits the downward movement of the trolley-arm by striking upon the upper side of the slide. This nut or stop may be adjusted vertically to regulate the distance which the trolley-arm may drop. The stem is hollow or tubular, and to its lower end is secured a flat guide-plate K, which operates in the slot of the conduit L, said plate being provided with a central longitudinal perforation or channel $k$, which registers with the bore of the stem. The guide-plate is approximately equal in thickness to the width of the slot in the conduit, so as to prevent twisting and jamming, and the plate is of sufficient width to hold the trolley-arm steady. To the lower end of the guide-plate is attached a U-shaped arm or extension M, which is hollow or tubular, its bore registering with the central perforation or channel in the plate, and to the free end of the arm or extension is secured the yoke N, in which is mounted the trolley O. The conductor or wire O' from the motor is insulated throughout its length and passes down through the tubular stem, through the perforation or channel in the plate, and through the hollow extension or arm, and is connected to the yoke N. Thus the trolley-arm is insulated and the current passes directly from the wire or conductor to the trolley, and therefore there is no loss by deflection. The motor P may be of any ordinary or preferred construction and forms no part of my invention, and therefore a detailed description will not be necessary herein.

The operating-lever Q is mounted on a bracket R at the front end of the truck, and is provided at its lower end with an L-shaped extension Q', to which is secured the flat spring-arm S. The spring-arm is provided at its free end with a fork s, which engages the stem of the trolley-arm between the collars T T, whereby when the lever is operated the free end of the spring-arm is elevated or depressed and the trolley-arm is similarly moved. When the parts are in the position shown in Fig. 6, the trolley will be in engagement with the wire; but if the upper end of the lever Q be drawn toward the car the lower end of the same and the spring-arm will be swung downward, thereby depressing the trolley, so as to disengage it from the wire and break the circuit. The car is then stopped by applying the brake. The slot s', which is formed by the fork in the end of the spring-arm, is of sufficient length to remain in engagement with the stem of the trolley-arm in all positions of the latter. A rack-bar V is arranged adjacent to the operating-lever to be engaged by the latter to hold it in the desired position.

From the foregoing description it will be seen that the trolley-arm is held in a vertical position at all times, and that in passing around a curve the slide in which the trolley-arm is mounted moves to one side or the other to accommodate the position of the slot. Furthermore, if the wheels of the truck leave the track-rails the trolley-arm remains in position in the slot and the trolley remains in contact with the wire until it is disconnected by means of the operating-lever in the ordinary way. The slide moves laterally to accommodate the position of the car, thereby preventing the straining of the trolley-arm, preventing the car from moving farther from the track than is permitted by the length of the slot and preventing the overturning of the car. Furthermore, as the trolley remains in contact with the wire, the motor may be employed to assist in replacing the car upon the track. Furthermore, the spring-arm causes the trolley to exert an even and steady pressure upon the wire, prevents jumping and breaking the circuit, and insures a perfect contact with the wire throughout.

The U-shaped extension or arm at the lower end of the trolley-arm enables the trolley to be carried above the water and rubbish at the bottom of the conduit and prevents water which may accumulate upon the trolley-arm above the slot from running down to the trolley and interfering with the contact.

It will be observed that the trolley-arm is capable of rotary movement and the guide-plate K is rigid with the trolley-arm, whereby the trolley is held in position on the wire independently of the position of the car, and therefore the wire cannot be strained when the car is thrown from the track or in passing around a curve. In passing around curves the trolley will maintain its vertical position and will slide laterally to accommodate the slot. I thus obviate the necessity of placing the slot to one side of the center of the track on curves.

Having thus described my invention, what I claim, and desire to secure by Letters Patent of the United States, is—

1. The combination, with a laterally-movable slide, of the trolley-arm mounted in said slide and provided with a flat guide-plate to operate in the conduit-slot, substantially as specified.

2. The combination, with the car, of the laterally-movable slide mounted thereon and the trolley carried by the said slide and movable vertically therein, as set forth.

3. The combination, with a slide, of a vertically-movable trolley-arm mounted in said slide and the adjustable stop mounted on the upper end of the trolley-arm to limit its vertical movement, substantially as specified.

4. A trolley-arm provided with a hollow or tubular stem, a guide-plate secured to the lower end of the stem and provided with a registering perforation, and a tubular extension bearing the trolley, in combination with a conductor passing through the stem, the perforation in the guide-plate, and the extension and insulated therefrom, substantialy as and for the purpose specified.

5. The combination, with a slotted bar, of a slide mounted on said bar and provided with a central bearing, the trolley-arm provided with a stem which is mounted in said bearing, and the operating-lever provided with a forked arm to engage the trolley-arm, substantially as specified.

6. The combination, with a laterally and vertically movable trolley-arm, of an operating-lever provided with a spring-arm which is engaged at its free end with the trolley-arm, substantially as specified.

In testimony whereof I affix my signature in the presence of two witnesses.

JOHN J. MILLER.

Witnesses:
 WILLIAM F. ROBB,
 WM. B. COX.